(12) United States Patent
Lloyd et al.

(10) Patent No.: US 6,402,248 B1
(45) Date of Patent: Jun. 11, 2002

(54) SEAT RECLINING MECHANISM

(75) Inventors: Raymond Arthur Lloyd; Michael Paul Hyde, both of Warwickshire (GB)

(73) Assignee: AJC Johnson Controls Ltd., Warwickshire (GB)

( * ) Notice: Subject to any disclaimer, the term of this patent is extended or adjusted under 35 U.S.C. 154(b) by 0 days.

(21) Appl. No.: 09/230,002

(22) PCT Filed: Jul. 14, 1997

(86) PCT No.: PCT/GB97/01905
§ 371 (c)(1),
(2), (4) Date: Oct. 6, 1999

(87) PCT Pub. No.: WO98/02329
PCT Pub. Date: Jan. 22, 1998

(30) Foreign Application Priority Data

Jul. 13, 1996 (GB) .............................. 9614787

(51) Int. Cl.[7] ................................ B60N 2/22
(52) U.S. Cl. ....................... 297/362; 475/345
(58) Field of Search .................. 297/362; 74/409; 475/331, 344, 345

(56) References Cited

U.S. PATENT DOCUMENTS

| | | | | |
|---|---|---|---|---|
| 4,345,792 A | * | 8/1982 | Shephard | 297/362 |
| 5,016,940 A | * | 5/1991 | Holloway | 297/362 |
| 5,090,771 A | * | 2/1992 | Kawakita | 297/362 |
| 5,098,359 A | * | 3/1992 | Chales et al. | 297/362 |
| 5,183,447 A | * | 2/1993 | Kawakita | 297/362 |
| 5,240,462 A | * | 8/1993 | Mochizuki et al. | 74/409 |

FOREIGN PATENT DOCUMENTS

| | | |
|---|---|---|
| EP | 0332340 | 3/1989 |
| GB | 1528357 | 2/1975 |

* cited by examiner

*Primary Examiner*—Peter R. Brown
(74) *Attorney, Agent, or Firm*—Foley & Lardner

(57) ABSTRACT

A seat reclining mechanism including a cushion arm pivotally connected to a squab arm by a planetary gear arrangement, the planetary gear arrangement including a pair of side by side ring gears, one of the ring gears being secured to the squab arm and the other of the ring gears being secured to the cushion arm, a sun and planetary gear arrangement common to both ring gears, the sun and planetary gear arrangement including a plurality of radially movable planetary gears surrounding a sun gear assembly, the sun gear assembly including at least one axially movable frusto-conical sun gear in engagement with said planetary gears, the at least one frusto-conical sun gear being axially biased so as to bias sun gear member into full meshing contact with the planetary gears and thereby bias the planetary gears in a radially outwards direction to a radially outermost position whereat the planetary gears are in full meshing contact with said ring gears, the sun gear assembly including a stop sun gear axially juxtaposed to said frusto-conical sun gear, said stop sun gear being in partial meshing contact with said planetary gears when at their radially outermost position such that the planetary gears are able to move radially inwards against said bias to a radially innermost position defined by the stop sun gear whereat the planetary gears are in full meshing contact with said stop sun gear.

11 Claims, 6 Drawing Sheets

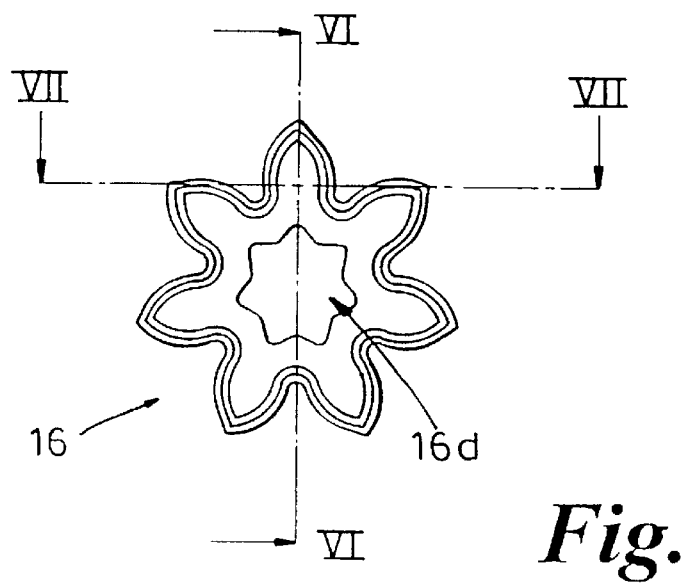
*Fig. 5*
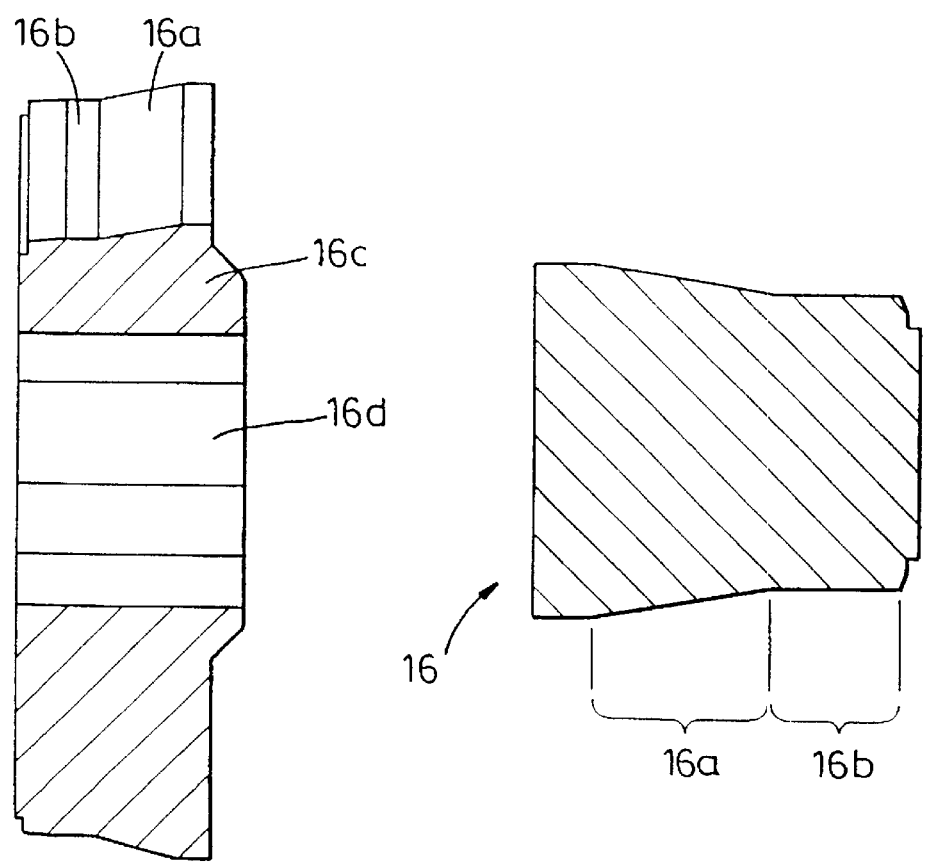
*Fig. 6*  *Fig. 7*

SEAT RECLINING MECHANISM

The present invention relates to a seat reclining mechanism. In our UK patents 1528357 and 1586869 we disclose a seat reclining mechanism which includes a cushion arm pivotally connected to a squab arm by a planetary gear arrangement. The planetary gear arrangement includes a pair of side by side ring gears, one being secured to the squab arm and the other being secured to the cushion arm. A sun gear is provided which is in driving connection with both ring gears via a plurality of planetary gears. The pitch of teeth in each of the ring gears is different so that rotation of the planetary gears causes relative rotation between the ring gears.

The planetary gears float and it is necessary for there to be an acceptable amount of tolerance between the gears in order to enable smooth operation. Unfortunately such tolerance also results in pivotal play between the squab and cushion arms.

According to the present invention there is provided a seat reclining mechanism including a cushion arm pivotally connected to a squab arm by a planetary gear arrangement, the planetary gear arrangement including a pair of side by side ring gears, one of the ring gears being secured to the squab arm and the other of the ring gears being secured to the cushion arm, a sun and planetary gear arrangement common to both ring gears, the sun and planetary gear arrangement including a plurality of radially movable planetary gears surrounding a sun gear assembly, the sun gear assembly including at least one axially movable frusto-conical sun gear in engagement with said planetary gears, the at least one frusto-conical sun gear being axially biased so as to bias sun gear member into full meshing contact with the planetary gears and thereby bias the planetary gears in a radially outwards direction to a radially outermost position whereat the planetary gears are in full meshing contact with said ring gears, the sun gear assembly including a stop sun gear axially juxtaposed to said frusto-conical sun gear, said stop sun gear being in partial meshing contact with said planetary gears when at their radially outermost position such that the planetary gears are able to move radially inwards against said bias to a radially innermost position defined by the stop sun gear whereat the planetary gears are in full meshing contact with said stop sun gear.

Accordingly when the sun gear assembly is static pivotal play between the squab arm and cushion arm is substantially reduced or eliminated by virtue of the planetary gears being radially biased outwardly into contact with the ring gears by the frusto-conical sun gear. In addition, when under radial loading, as for example when the sun gear assembly is driven, the planetary gears are able to move radially inwardly into full mesh with the stop sun gear. This provides a positive smooth drive from the sun gear assembly to the planetary gears.

Preferably a pair of frusto-conical sun gears are provided arranged with their smaller diameter axial ends facing one another and such that they are located on opposite axial sides of the planetary gears. The biasing means are arranged such as to urge the two frusto-conical sun gears axially toward one another. This may be achieved by having one frusto-conical sun gear axially fixed and the other axially movable or both frusto-conical sun gears may be axially movable.

Preferably three planetary gears are provided which are equally spaced about the internal circumference of the ring gears. Three planetary gears are preferred since such an arrangement ensures that each sun gear will apply an equal radial loading on each planetary gear. However it is to be appreciated that more than three planetary gears may be provided if necessary.

The mechanism may also include at least one support member for the planetary gears of the type disclosed in our UK patent 1586869. Thus the support member would include for each planetary gear a concave surface.

In the present invention, the support member serves primarily to maintain the circumferential spacing of the planetary gears whilst the planetary gears are located between their radially inner and outermost positions. Preferably the support member is arranged to supplement accommodation of radially inwardly directed loadings when the planetary gears are located at their radially innermost positions. Such an arrangement enables the mechanism to withstand excessive radially inwardly directed loadings as may for example arise during a vehicle crash.

Preferably the included angle between the inclined peripheral face of each frusto-conical sun gear and its axis is small, for example in the range 2° to 15°.

Preferably the frusto-conical sun gear, stop sun gear and planetary gears have involute teeth. This facilitates smooth operation of the mechanism.

The frusto-conical sun gear and stop sun gear may be separate components located axially side by side, or alternatively the frusto-conical sun gear and stop sun gear may be integrally formed.

Various aspects of the present invention are hereinafter described with reference to the accompanying drawings, in which:

FIG. 5 is a side view of a sun gear according to one embodiment of the invention;

FIG. 6 is a section along line VI—VI in FIG. 5;

FIG. 7 is a section along line VII—VII in FIG. 5;

Figure 3:
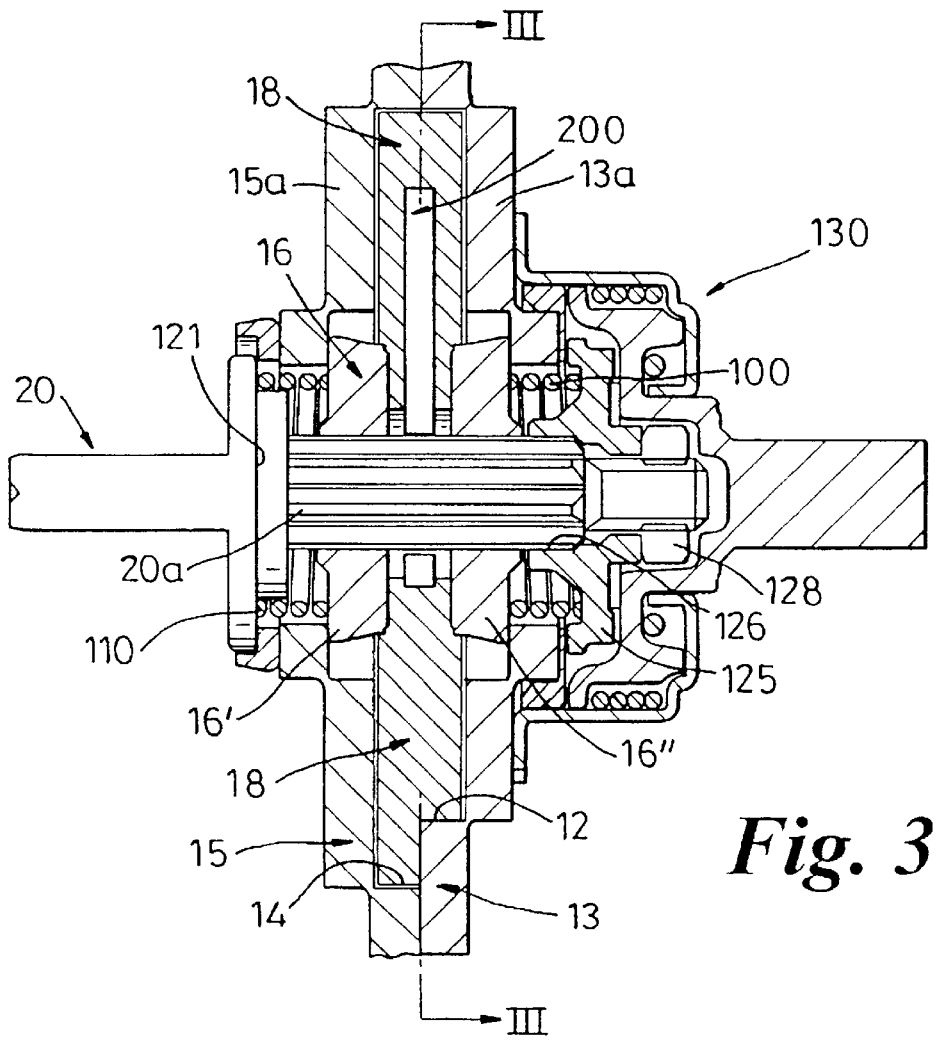
FIG. 3 is a more detailed part sectional view taken along line III—III in FIG. 2.
Figure 8A:
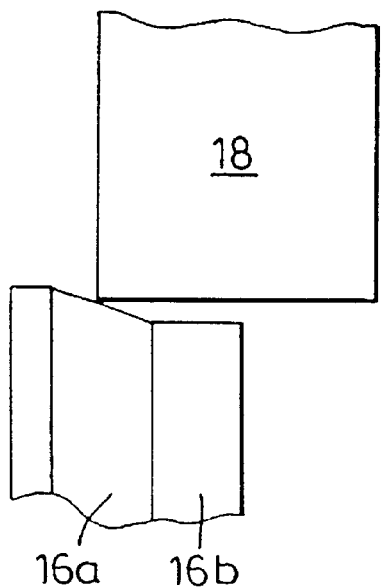
Figure 8B:
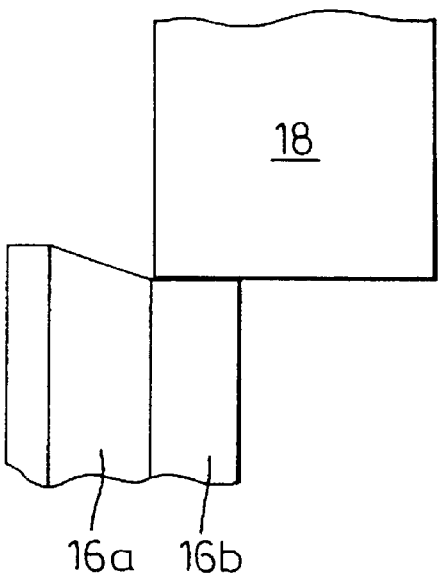
Figure 9:
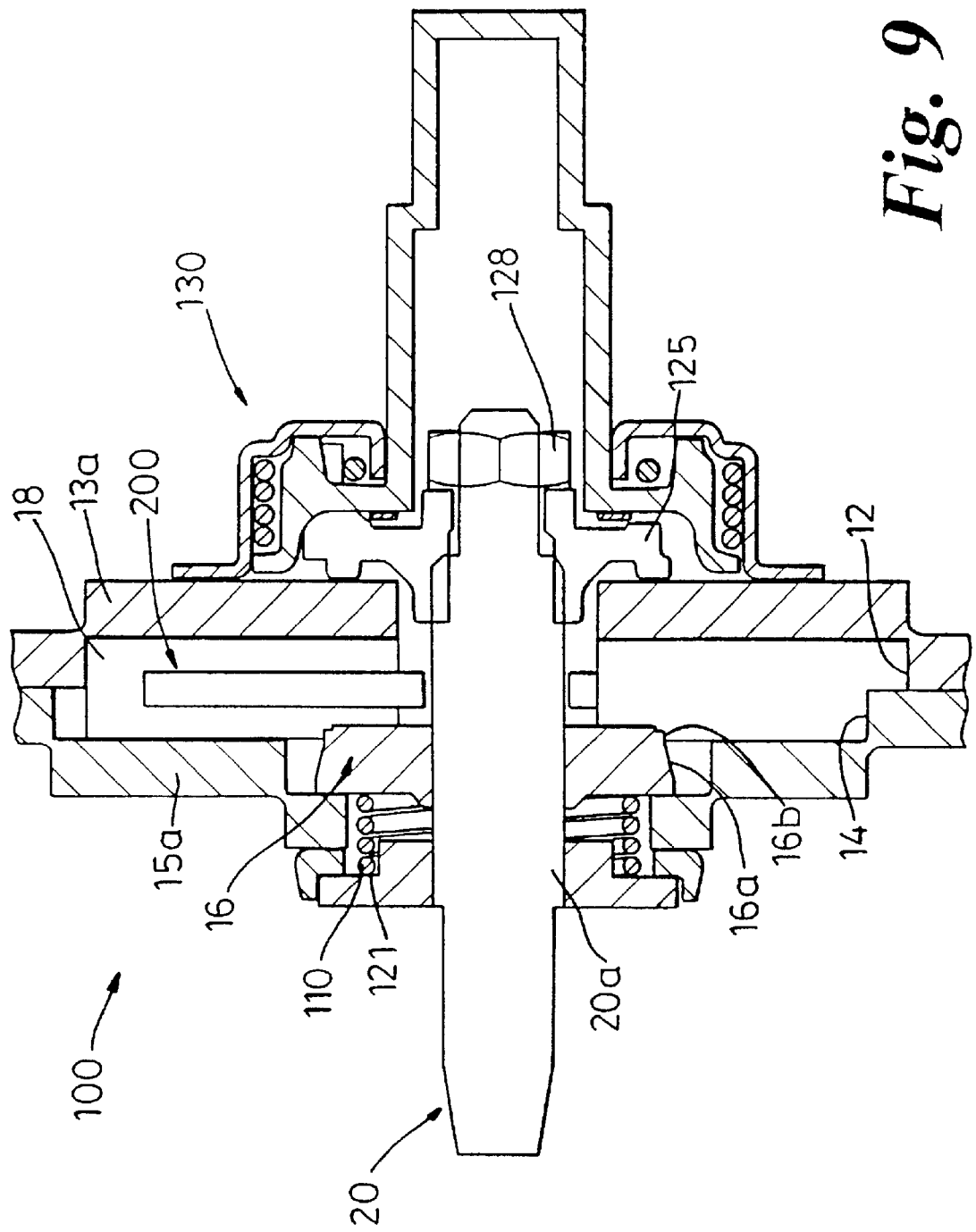
Figure 10:
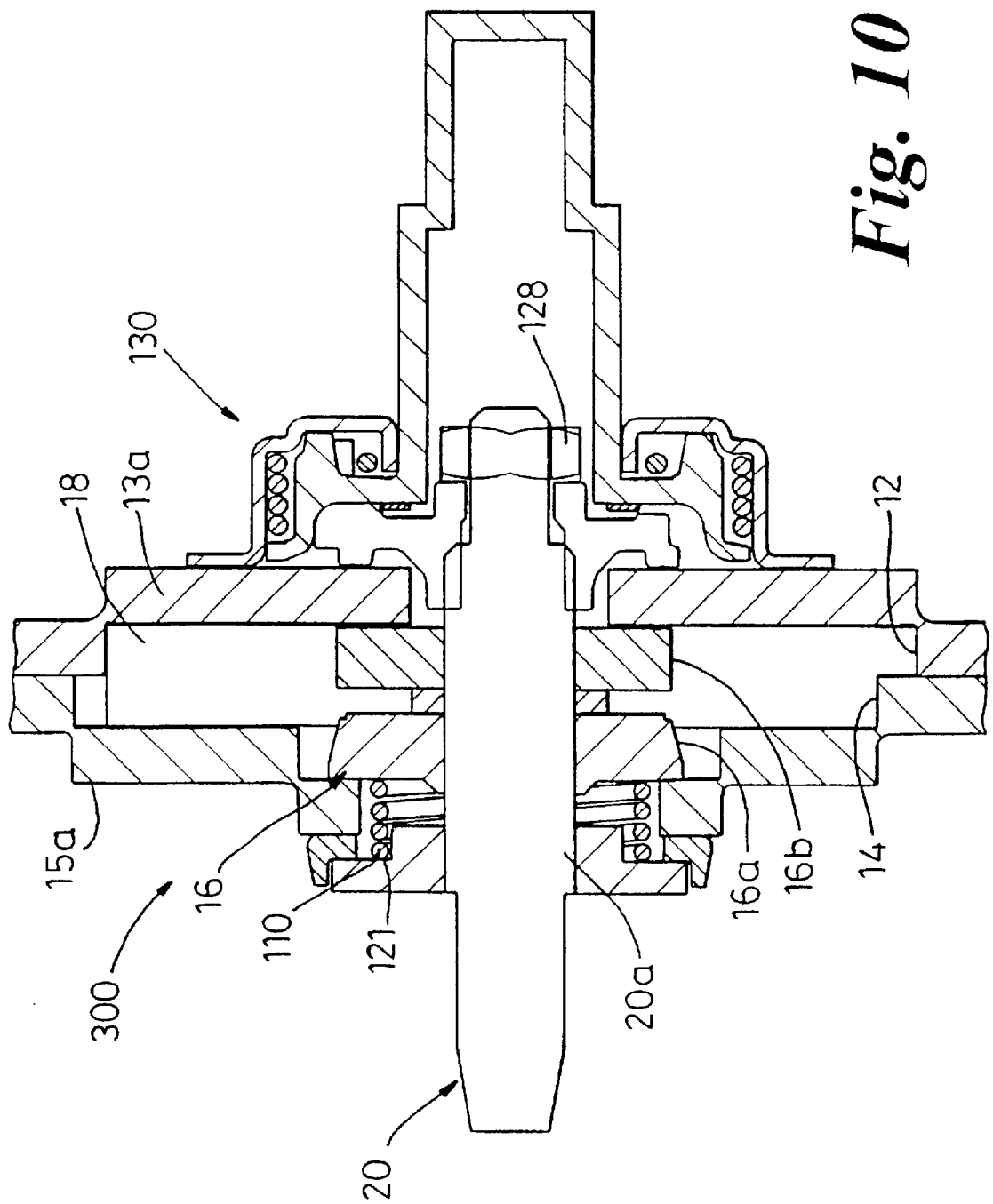

FIGS. 8a, 8b schematically illustrate location of a planetary gear at a radially outermost position and radially innermost position respectively;

FIG. 9 is an axial sectional view similar to FIG. 3 showing a further embodiment according to the present invention; and FIG. 10 is an axial sectional view similar to FIG. 3 showing a further embodiment according to the present invention.

Figure 1:
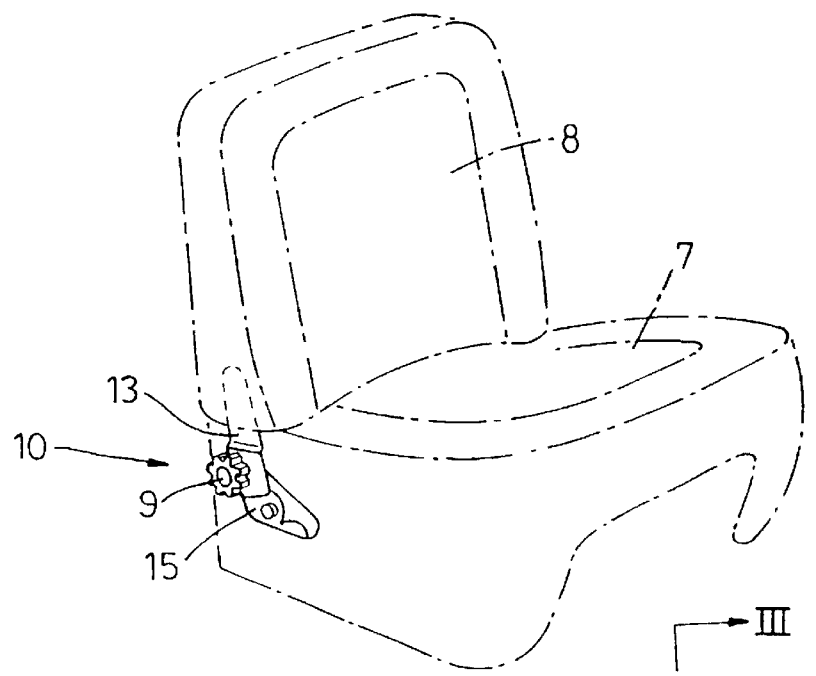
FIG. 1 is a schematic perspective view of a vehicle seat including a seat reclining mechanism according to the present invention.

The seat reclining mechanism 10 of the present invention is used to pivotally connect a seat back or squab 8 to a seat cushion 7. Although one mechanism 10 can be used per seat, preferably two mechanisms 10 are used, one being located on either side of the seat(only one of which is visible in FIG. 1) and each mechanism 10 includes a squab arm 13 secured to the frame (not shown) of the squab and a cushion arm 15 secured to the frame (not shown) of the cushion. The mechanisms are both driven by a handle 9.

Figure 2:
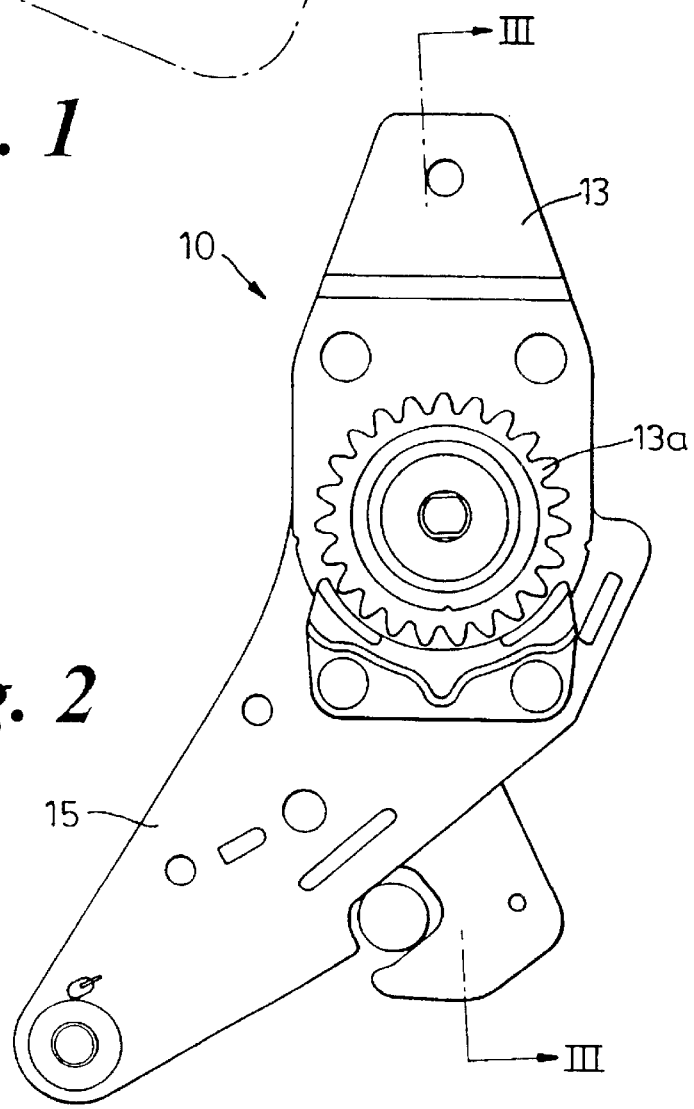
FIG. 2 is a schematic side view of a seat reclining mechanism according to the present invention.

In the embodiment illustrated, the mechanism includes a first ring gear 12 which forms part of the squab arm 13 (only part of which is visible in FIG. 2) and a second ring gear 14 which forms part of a cushion arm 15 (only part of which is visible in FIG. 2). The squab and cushion arms are more fully illustrated in our UK patents 1528357 and 1586869.

The squab and cushion arms are preferably formed from metal plate and the ring gears 12, 14 are preferably formed by a pressing operation. The pressing operation provides offset wall portions 13a, 15a which together with the internal walls of the ring gears define a housing for the sun and planetary gears 16 and 18 respectively.

Figure 4:
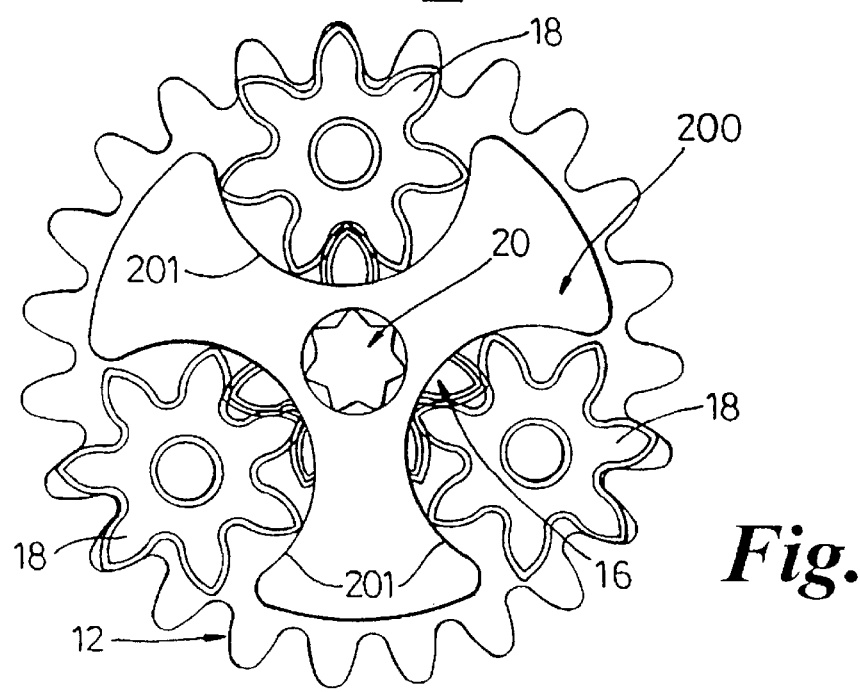
FIG. 4 is a part sectional view taken along line IV—IV in FIG. 3.

As seen in FIG. 4, three planetary gears 18 are provided which are equi-spaced about the internal circumference of the ring gears 12, 14.

As seen in FIG. 3 the mechanism preferably includes a pair of identical sun gears 16', 16". A single sun gear 16 is shown in greater detail in FIGS. 5 to 7 from which it will be seen that each gear 16 includes a frusto-conical gear portion 16a and an axially juxtaposed cylindrical gear portion 16b.

Each gear 16', 16" is axially slidably received on a drive shaft 20 so as to be rotatable in unison therewith. Each gear 16', 16" is urged axially toward one another by associated springs 110.

As seen in FIG. 3 the drive shaft 20 includes a main portion 20a which extends through the hinge assembly. The main portion 20a is preferably fluted to define in cross-section a star shape (see FIG. 4). At one side of the hinge assembly the main portion 20a is provided with a shoulder 121 which is preferably formed integrally with the main portion 20a. A coil spring 110 is compressed between the shoulder 121 and sun gear 16'. This has the effect of biasing sun gear, 16' in an axial direction toward sun gear 16".

At the opposite side of the hinge assembly the main portion 20a is provided with a cap 125. The cap 125 includes an internal bore 126 which has a portion having a cross-sectional shape complementary with the main portion 20a and so is rotatable in unison therewith. The cap 125 is held axially captive on the shaft by a nut 128. The cap 125 comprises a dog of conventional brake unit 130 which in use acts to resist regression of the hinge assembly.

A coiled spring 110 is compressed between cap 125 and sun gear 16". This has the effect of biasing the sun gear 16" in an axial direction toward sun gear 16'.

As seen in FIG. 5 each sun gear 16', 16" has a central bore 16d having a cross-sectional shape complementary with the cross-sectional shape of the shaft portion 20a which enables each sun gear to slide axially along the main shaft portion 20a and yet be rotationally fixed relative thereto. Preferably the star shape of the main shaft portion 20a and sun gear bore is chosen to have the same number of star arms as the number of teeth on the sun gear, the star arms being radially aligned with the teeth. This facilitates ensuring that both sun gears 16', 16" are correctly aligned during assembly of the mechanism.

However, it will be appreciated that other cross-sectional shapes of the main shaft 20a may be adopted if desired, such as for example a polygonal shape.

Accordingly, as more clearly shown in FIG. 8a, the frusto-conical gear portion 16a of each gear 16', 16" is urged into contact with the planetary gears 18 and this has the effect of urging the planetary gears 18 in a radially outwards direction to engage the ring gears 12, 14. The springs 110 therefore serve to remove play between the gears 12, 14, 16 and 18.

Under certain circumstances, radially inwardly directed loadings are applied onto the planetary gears 18. This, for example, can arise during driving of the sun gears 16', 16" when adjusting the pivotal angle between arms 13, 15 whilst a load is applied onto one of the arms 13, 15.

Under such circumstances, the planetary gears 18 are permitted to move radially inwardly to displace the sun gears 16', 16" axially against the bias of springs 110 and thereby enable the planetary gears to mesh in full contact with the cylindrical gear portions 16b. This is illustrated in FIG. 8b. In this condition, drive is smoothly transmitted from the sun gears 16', 16" to the ring gears 12, 14 via the planetary gears 18. In addition, once the planetary gears 18 are fully seated on the cylindrical gear portions 16b further radially directed loadings are transmitted to the drive shaft without causing additional axial displacement of the sun gears 16', 16".

Accordingly, under static conditions the influence of the bias of spring 110 causes each frusto-conical gear portion 16a to move the planetary gears 18 radially outwardly and maintain the planetary gears 18 at a radially outermost position ( FIG. 8a) whereat the planetary gears are in full mesh contact with the ring gears 12, 14 and gear portion 16a whereas under dynamic conditions, such as during adjustment of the mechanism under applied loadings, the bias of springs 110 is preferably chosen to be insufficient to overcome radially inwardly directed loadings on the planetary gears such that the planetary gears 18 are able to move radially inwardly to a radial innermost position (FIG. 8b) whereat the planetary gears 18 are in full mesh contact with the cylindrical gear portions 16b.

The planetary gears 18 are each of cylindrical form and the angle of inclination for the frustoconical gear portion 16a is chosen bearing in mind the functional requirement for the sun gears 16', 16" to be capable of being moved axially outward by the planetary gears and being moved axially inward by the bias of springs 110.

Accordingly, the angle of inclination adopted is preferably greater than 0° and less than about 45°. The greater the angle of inclination, the stronger the biasing force required to be generated by springs 110.

It is generally desirable for springs 110 to generate a low biasing force in order to reduce operating torques and so it is preferable for the angle to range between about 1° to about 15°. In a typical arrangement, the angle of inclination adopted is about 10° and the biasing force applied by the springs 110 is about 40 Newtons.

Preferably each gear 16', 16" is provided with a boss portion 16c located on its outer side so as to provide an axial extension to its axial. bore 16d and thereby provide greater resistance to twisting of each gear 16', 16" when under load.

It is envisaged that the edges of the planetary gears 18 may be chamfered slightly to assist axial entry of each sun gear 16 without interfering with the rolling action of the gears.

It will be seen in FIG. 4 that the gear profiles are involute. This provides for smooth operation of the mechanisms since the planetary gears and ring gears are maintained in rolling contact. If desired however the gear profiles adopted in our UK patents 1528357 and 1586869 may be used.

It is envisaged that only one of the sun gears 16' or 16" includes a cylindrical portion 16b. It is also envisaged that the sun gears 16' and 16" comprise frusto-conical portions 16a only and that a separate cylindrical sun gear portion 16b be located inbetween the sun gears 16', 16".

It is also envisaged that only one sun gear 16 be provided. Such an embodiment 100 is illustrated in FIG. 9 wherein parts similar to those described in connection with FIGS. 1 to 8 have been designated by the same reference numerals.

A further embodiment 300 is illustrated in FIG. 10 which illustrates a mechanism in which a single sun gear 16 is provided having a frusto-conical portion 16a only and in which a separate cylindrical gear 16b is provided. Again parts similar to those described in connection with FIGS. 1 to 8 have been designated by the same reference numerals.

If desired a support member 200 (FIGS. 3 and 4) may be included. The support member has concave depressions 201 in each of which a planetary gear 18 is seated. The depressions 201 in the support member 200 serve to guide rotary movement of the planetary gears and maintain their circumferential spacing.

The shape and dimensions of the depressions 201 are chosen such that the support member 200 does not interfere with the planetary gears 18 moving radially inwardly to their radial innermost position (FIG. 8b) but do provide additional support to prevent radial inward movement beyond said innermost position in the event of excessive loadings.

As illustrated in the drawings, three planetary gears 18 are preferred. This is because three is the minimum number of gears which can be acted upon by the sun gear(s) to ensure that the sun gear(s) apply an equal load to all planetary gears irrespective of the concentricity of the ring gears 12, 14 and/or the circularity of each ring gear 12, 14.

If a larger number of equally spaced planetary gears 18 are to be used, preferably the number is chosen such that no two gears are diametrically opposed ie an odd number of gears is chosen.

In the embodiments described above and illustrated in the drawings, the pivotal movement between the squab and cushion arms is defined and support by the gear system, ie by the intermeshing of the sun, planetary and ring gears and there is no separate journal for supporting the pivotal movement. It will be appreciated however that the squab and cushion arms could be pivotally connected by journal formations and that the sun, planetary and ring gears be utilised to cause relative rotation about the pivot only.

What is claimed is:

1. A seat reclining mechanism including a cushion arm pivotally connected to a squab arm by a planetary gear arrangement, the planetary gear arrangement including a pair of side by side ring gears, one of the ring gears being secured to the squab arm and the other of the ring gears being secured to the cushion arm, a sun and planetary gear arrangement common to both ring gears, the sun and planetary gear arrangement including a plurality of radially movable planetary gears surrounding a sun gear assembly, the sun gear assembly including at least one axially movable frusto-conical sun gear in engagement with said planetary gears, biasing means for biasing the at least one frusto-conical sun gear axially so as to bias said sun gear into full meshing contact with the planetary gears and thereby bias the planetary gears in a radially outward direction to a radially outermost position whereat the planetary gears are in full meshing contact with said ring gears, the sun gear assembly including a generally cylindrical stop sun gear axially juxtaposed to said frusto-conical sun gear, said stop sun gear being in partial meshing contact with said planetary gears when at their radially outermost position the biasing means being arranged such that during operation of the seat reclining mechanism the planetary gears are able to move radially inwards against said bias to a radially innermost position defined by the stop sun gear whereat the planetary gears are in full meshing contact with said stop sun gear.

2. A mechanism according to claim 1 wherein a pair of frusto-conical sun gears are provided arranged with their smaller axial ends facing one another and such that they are located on opposite axial sides of the planetary gears.

3. A mechanism according to claim 2 wherein the biasing means are arranged such as to urge the two frusto-conical sun gears axially toward one another.

4. A mechanism according to claim 3 wherein one frusto-conical gear is axially fixed and the other is axially movable by said biasing means.

5. A mechanism according to claim 3 wherein both frusto-conical gears are axially movable by said biasing means.

6. A mechanism according to claim 1 further including three planetary gears equally spaced about the internal circumference of the ring gears.

7. A mechanism according to claim 1 further including at least one support member for the planetary gears, the support member having a recess defined by a concave surface for each planetary gear, the support member serving to maintain the circumferential spacing between the planetary gears whilst the planetary gears are located between their radially inner and outermost positions.

8. A mechanism according to claim 1 wherein the support member is arranged to supplement accommodation of radially inwardly directed loadings when the planetary gears are located at their radially innermost positions.

9. A mechanism according to claim 1 wherein an included angle between an inclined peripheral face of east frusto-conical sun gear and its axis is in the range of 2° to 15°.

10. A mechanism according to claim 1 wherein the stop gear is integrally formed with the at least one sun gear.

11. A mechanism according to claim 1 wherein the stop sun gear is a separate component located axially side by side with the at least one sun gear.

* * * * *